United States Patent [19]

Hayashi et al.

[11] Patent Number: 5,303,791

[45] Date of Patent: Apr. 19, 1994

[54] REAR WHEEL STEERING DEVICE FOR A VEHICLE

[75] Inventors: Hiroyuki Hayashi; Toshiro Kondo; Fumitaka Ando; Hirotaka Kanazawa; Takeshi Edahiro; Ryuya Akita, all of Hiroshima, Japan

[73] Assignee: Mazda Motor Corporation, Japan

[21] Appl. No.: 769,196

[22] Filed: Sep. 30, 1991

[51] Int. Cl.⁵ ............................................. B62D 5/04
[52] U.S. Cl. .................................... 180/79.1; 180/142
[58] Field of Search ...................... 180/79.1, 132, 142, 180/149

[56] References Cited

U.S. PATENT DOCUMENTS

| 4,834,202 | 5/1989 | Shimizu | 180/79.1 |
| 4,953,651 | 9/1990 | Lescaut | 180/79.1 X |
| 5,165,495 | 11/1992 | Fujii | 180/79.1 |

FOREIGN PATENT DOCUMENTS

| 59-23716 | 2/1959 | Japan |
| 62-18309 | 1/1962 | Japan |

*Primary Examiner*—Joseph D. Pape
*Attorney, Agent, or Firm*—Thompson, Hine and Flory

[57] ABSTRACT

Two support members which are supported swingably to the vehicle body through the medium of the support axis extending in up and down direction are provided at the vehicle body end portions of two left and right suspension arm members connecting left and right rear wheels to the vehicle body. Lever parts are extended from the support members toward the opposing direction to each other and are interconnected by a link member. One of the two support members is driven by one actuator for rotation around an support axis, whereby left and right two suspension arm members move in vehicle widthwise direction, opposite to each other, and in synchronism with each other and thus left and right rear wheels are steered symmetrically in toe-in direction or toe-out direction. Since the motive power mechanism part is of simple construction using link members, and engaging parts of gears can be lessened, the device according to the present invention can contribute to compactness and cost reduction and also can restrict "shaking" in rear wheel steering due to backlash of gears.

14 Claims, 12 Drawing Sheets

REAR WHEEL STEERING DEVICE FOR A VEHICLE

BACKGROUND OF THE INVENTION

This invention relates to a rear wheel steering device for vehicles, particularly, to an improvement on a steering device which steers left and right rear wheels symmetrically in toe-in direction or toe-out direction.

A rear wheel steering device of this kind has been known, for example, Japanese Patent Application Laying Open Gazette No. 62-18309 discloses a device provided with a driving motor, a drive shaft connected to said motor to be driven through the medium of a gear mechanism and a pair (left and right) of screw feeding mechanism which transmits a rotary motion of the drive shaft as movement in axial direction (vehicle widthwise direction) of suspension arm members of left and right rear wheels, whereby left and right rear wheels are steered symmetrically in toe-in direction or toe-out direction according to vehicle velocity. Also, Japanese Patent Application Laying Open Gazette No. 59-23716 discloses a device which steers left and right rear wheels by two (left and right) hydraulic cylinders which are substituted for the driving motor mentioned above.

Of the conventional rear wheel steering devices mentioned above, in the case of the former two gear engaging parts (a screw feeding mechanism and a gear mechanism) are provided intermediately of a transmitting route between the motor and the rear wheel and backlash at each of such gear engaging parts can cause "shaking" in rear wheel steering. On the other hand, in the case of the latter because two (left and right) cylinders are controlled individually, it is difficult to synchronize suspension arm members of left and right rear wheels and the composition of hydraulic system which controls each hydraulic cylinder becomes complicated. Thus, the device itself becomes large in size and high in manufacturing cost.

SUMMARY OF THE INVENTION

An object of the present invention is to provide a rear wheel steering device for vehicles which is compact in size and involves slight "shaking" caused by backlash.

In order to achieve the above object, the rear wheel steering device for vehicles according to the present invention which steers left and right rear wheels symmetrically has the following composition, namely, it comprises two (left and right) suspension arm members which extend in the vehicle widthwise direction and connects each rear wheel to a vehicle body, two (left and right) support members which are provided at an end portion of the vehicle body side of each suspension arm member and are swingably supported on the vehicle body through the medium of a support axis extending in a vertical direction, two lever parts extending from each supporting member in the direction opposite to each other, a link member which interconnects the two lever members and an actuator which revolves one of the two support members around the support axis mentioned above.

In the above composition, when the actuator works and one of the two support members rotates around the support axis, one of the suspension arm members connected to the support member is displaced in the vehicle widthwise direction and motive power is transmitted from said support member to the other support member through the medium of a link mechanism comprising two lever parts and a link member, whereby the other suspension arm member connected to said support member is displaced, in synchronism with displacement in the vehicle widthwise direction of one of the suspension arm members mentioned above but toward the side opposite to the vehicle widthwise direction in which of the suspension arm members mentioned above is displaced and thus left and right rear wheels are steered symmetrically in toe-in direction or toe-out direction. Also, in this composition the revolution of one of the support members is transmitted to the other support member by means of a link mechanism and therefore it is possible to minimize backlash at the power transmitting system and to restrain "shaking" in rear wheel steering as far as possible. Besides, since this composition is simple, compactness and cheaper cost of the device can be planned.

The above and other objects, features and advantage of the present invention will be understood more clearly from the following description of preferred embodiments of the present invention, made with reference to the accompanying drawings.

BRIEF DESCRIPTION OF THE DRAWINGS

The accompanying drawings show preferred embodiments of the present invention. FIG. 1 through FIG. 8 show the first embodiment of the present invention, in which:

DETAILED DESCRIPTION OF THE INVENTION

A description is made below of preferred embodiments of the present invention on the basis of the accompanying drawings.

Figure 1:
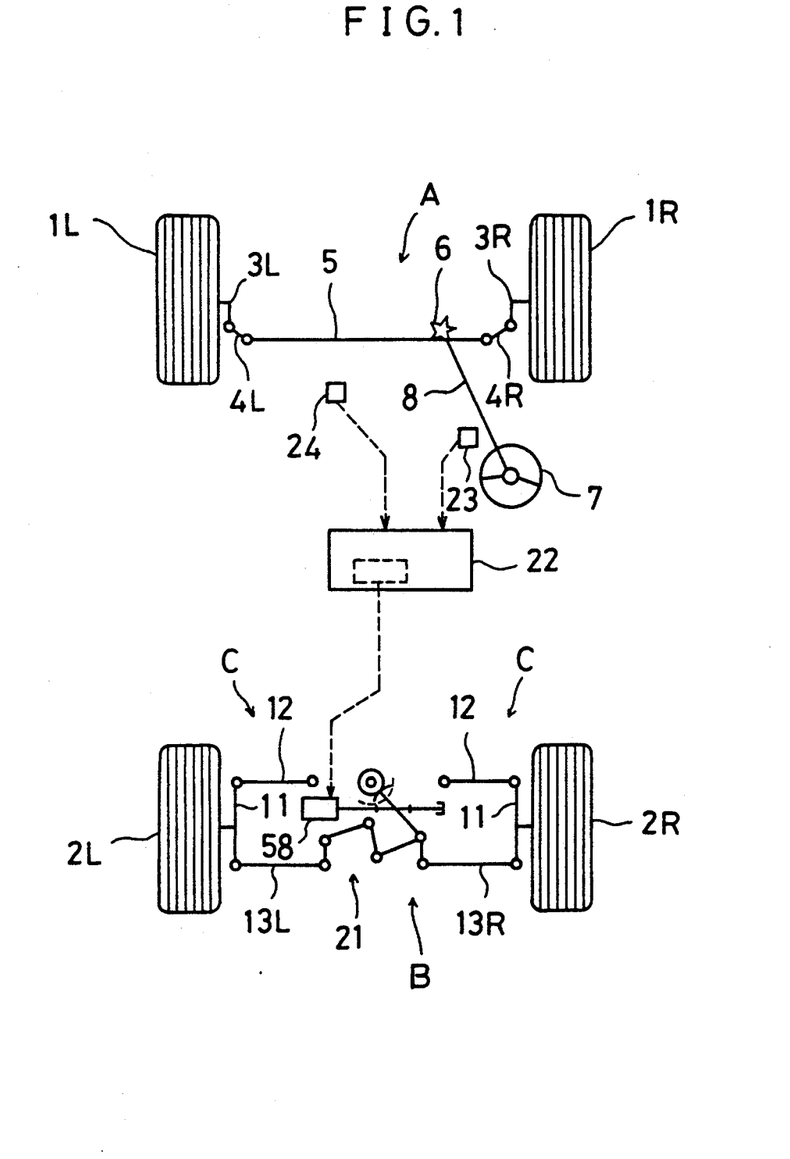
FIG. 1 is a skelton drawing showing an overall composition of a steering device for vehicles.

FIG. 1 shows an overall composition of a steering device for vehicles provided with a rear wheel steering device according to Embodiment 1 of the present invention. The steering device for vehicles is composed of a front wheel steering device A which steers left and right front wheels 1L, 1R and a rear wheel steering device B which steers left and right front wheels 2L, 2R.

The front wheel steering device A is provided with a pair (left and right) of knuckle arms 3L, 3R, a pair (left and right) of tie rods 4L, 4R, a relay rod 5 which interconnects said pair of tie rods 4L, 4R and a steering shaft 8 having at one end thereof a pinion 6 which engages with a rack teeth (not shown in the drawing) formed on said relay rod 5 and at the other end thereof a steering wheel 7. By handle manipulation by the steering wheel 7, the relay rod 5 is displaced in the vehicle widthwise direction, whereby left and right front wheels 1L, 1R are steered in the same direction.

On the other hand, left and right rear wheels 2L. 2R are suspended to the vehicle body by a suspension device C. The suspension device C is provided with a wheel supporting member 11 which rotatably supports rear wheels 2L, 2R and a pair (front and rear) of lateral links 12, 13L (or 13R) as a suspension arm member which connects a front end and a rear end of the wheel supporting member 11 to the vehicle body side.

The rear wheel steering device B is provided with a driving mechanism part 21 which is connected to end portions of vehicle body side of left and right rear side lateral links 13L, 13R and displaces them in axial direction (vehicle widthwise direction) so as to steer left and right rear wheels 2L, 2R symmetrically in toe-in direction or in toe-out direction and a control unit 22 composing a control part which controls the driving mechanism part 21 (for particulars, refer to the working of a driving motor to be described later).

Figure 7:
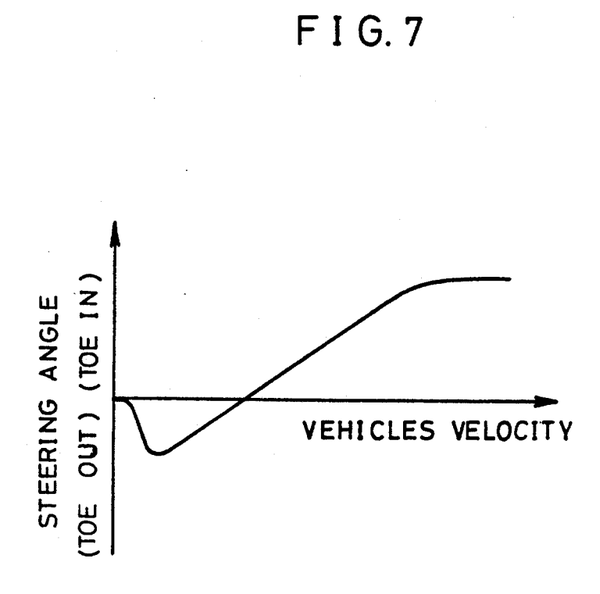
FIG. 7 is a characteristic drawing showing the steering characteristic of the rear wheel.

Reference numeral 23 designates a handle steering angle sensor which detects a handle steering angle and reference numeral 24 designates a vehicle velocity sensor which detects vehicle velocity. Signals from these sensors 23, 24 are inputted in the control unit 22. Control on the driving mechanism part 21 by this control unit 22 is carried out according to vehicle velocity as shown in FIG. 7, namely, at a low vehicle velocity rear wheels 2L, 2R are steered in toe-out direction and at medium or high vehicle velocity rear wheels 2L, 2R are steered in toe-in direction.

The concrete composition of the driving mechanism part 21 is shown in detail in FIG. 2 through FIG. 6.

In FIG. 2 through FIG. 6, reference numeral 31 designates a cross member which is a vehicle body intensification member disposed in the vehicle widthwise direction. The cross member 31 composes a closed section of substantially rectangular shape by an upper panel 31a and a lower panel 31b. Connected swingably up and down to the front side of the cross member 31 through the medium of an elastic bush 33 are vehicle body side end portions of left and right front side lateral links 12. Also, fixed to the front side of the cross member 31 is a cover member 34 which covers the elastic bush 33. An opening part 35 is made at the rear side wall surface of the cross member 31. The unitized driving mechanism part 21 of the rear wheel steering device B is inserted into the cross member 31 from the opening part 35 and is set there.

The driving mechanism part 21 is connected, at a rear end portion thereof which projects rearwardly from the opening part 35 of the rear side wall surface of the cross member 31, with vehicle body side end portions of left and right rear side lateral links 13L, 13R through the medium of globular joints 42 and is provided, at a front end portion thereof, with two (left and right) support members 44, 45 supported swingably (rotatably) on a housing 40 through the medium of support axes 43 extending in up and down direction, a left side lever part 46 (substantially rectangular shape in section) extending horizontally toward the inner side of vehicle body in slant and rear direction (side of the right side lever part 47 to be described later) from a front end portion of the left side support member 44 in plane view, a right side lever part 47 (substantially rectangular shape in section) extending horizontally toward the inner side of vehicle body (side of the left side lever part 46) in slant and front direction from a front end portion of the right side support member 45 in plane view, a link member 48 which is connected swingably, at both end portions thereof, to forward end portions of left and right lever parts 46, 47 extending in opposite direction each other and interconnects both lever parts 46, 47, an arm part 50 extending horizontally in slant and front direction (forwardly of the right side lever part 47) toward the inner side of vehicle body (which is the side opposite to the side where the rear side lateral link member 13R is arranged) from a front end portion of the right side support member 45 and having a gear part 49 at a front end surface thereof, a first gear 52 which engages with the gear part 49 of the arm part 50 and has an axis 51 extending in up and down direction, a second gear 54 comprising a worm wheel with its base end portion located at the position upwardly of the first gear 52 on the axis 51 of the first gear 52 for synchronous rotation with the first gear 52 and with a gear part 53 formed at its forward end side, a third gear 55 comprising a worm gear which engages with the gear part 53 of the second gear 54, a transmission shaft 56 having the third gear 55 about its intermediate part and supported rotatably on the housing 40 at its right side end portion, and a driving motor 58 which is connected to the left side end portion of the transmission shaft 56 through the medium of a connecting part 57 and is rotatable normally and reversely as an actuator which drives the transmission shaft 56 for rotation.

Figure 2:
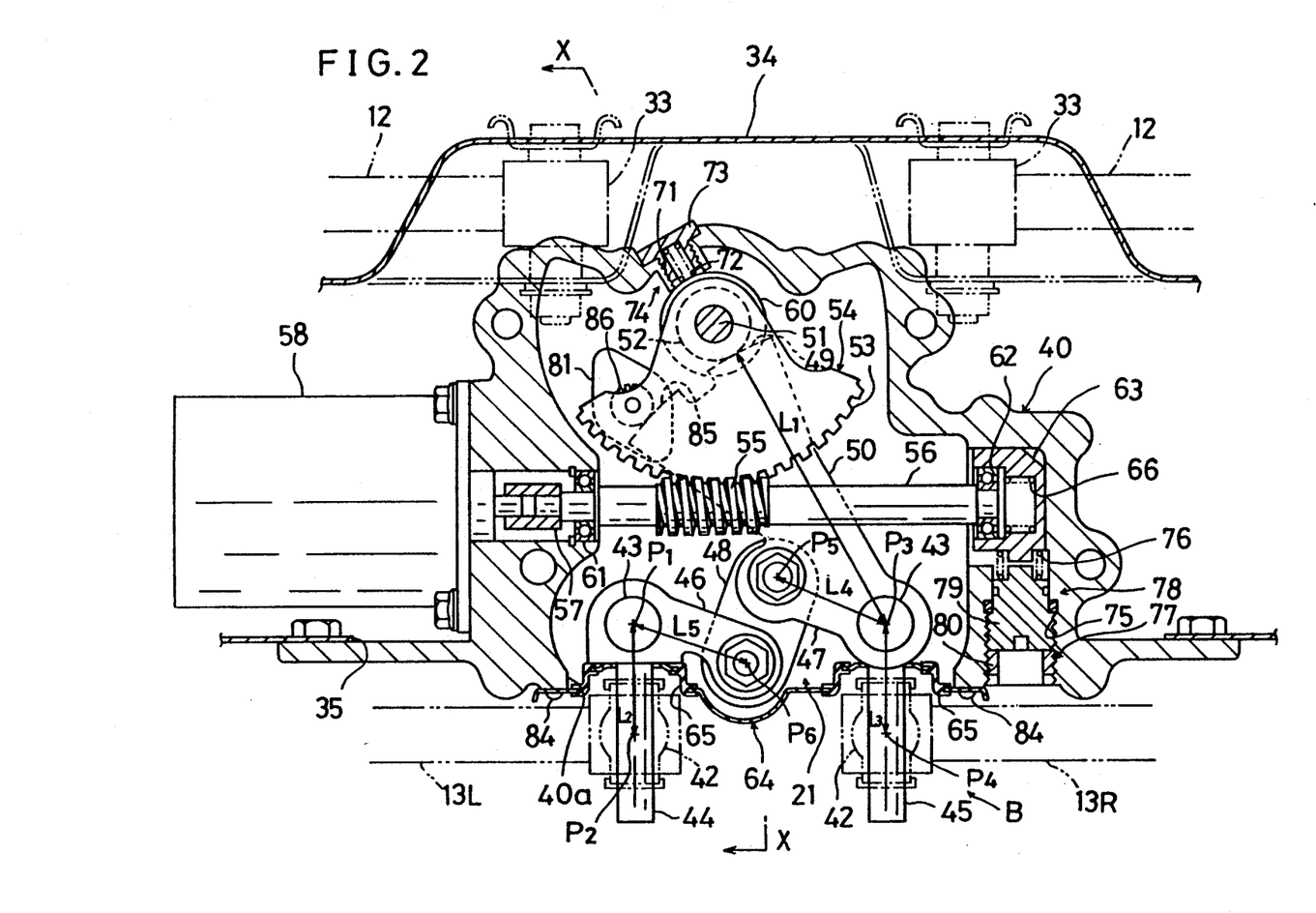
FIG. 2 is a plan view, showing the composition of a driving mechanism part of the rear wheel steering device, pertly cut away.
Figure 3:
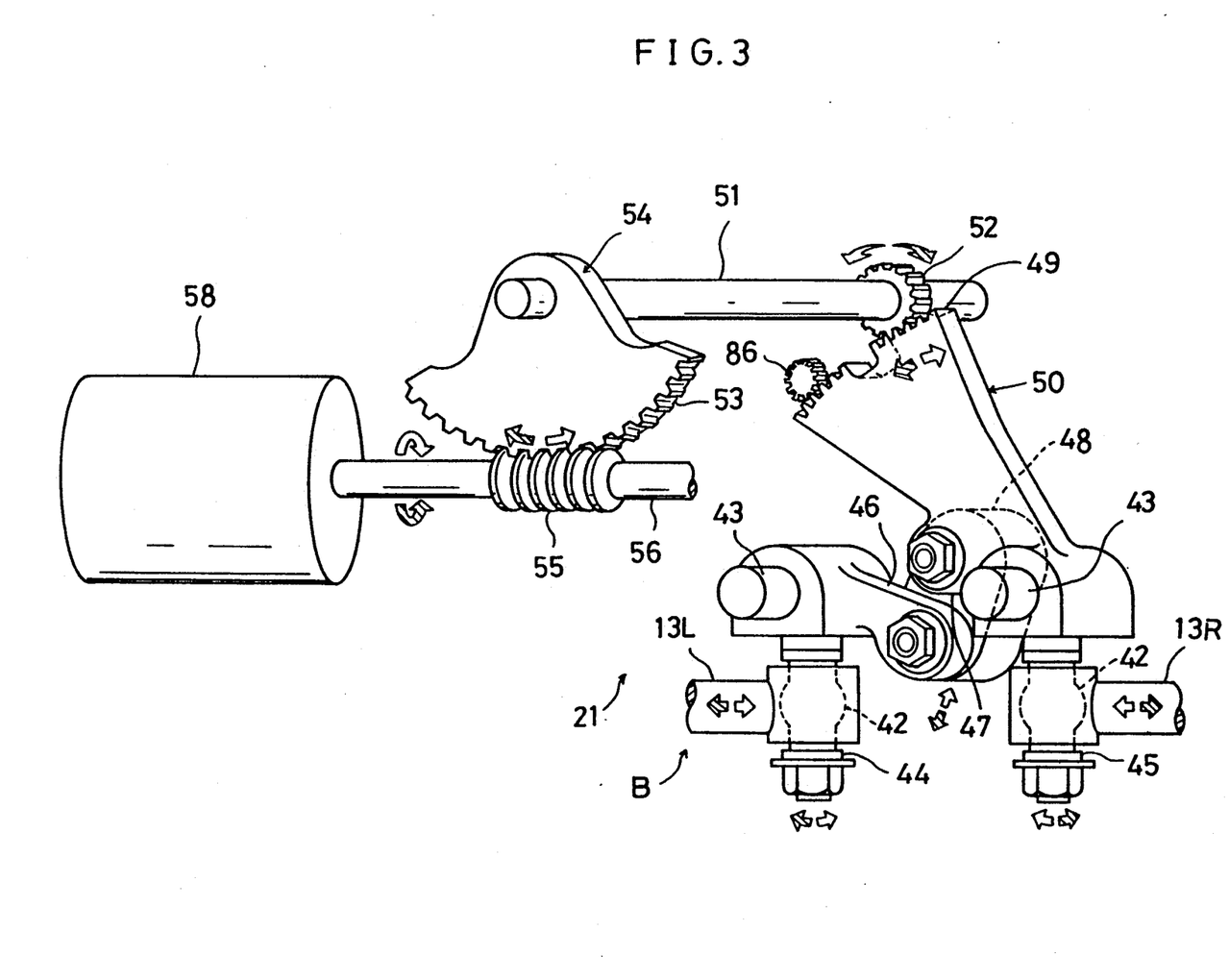
FIG. 3 is a perspective view of the driving mechanism part shown in FIG. 2.

The length L1 between the rotation center point P3 (center point of the support axis 43) and a forward end of the arm part 50 is longer than the length L3 between the rotation center point P3 of the support member 45 and the connection center point P4 of the support member 45 and the rear side lateral link 13R, (L1>L3). The length L2 between the rotation center point P1 of the left side support member 44 and the connection center point P2 of the support member 44 and the rear side lateral link 13L is made equal to the length L3 between the rotation center point P3 of the right side support member 45 and the connection center point P4 of the support member 45 and the rear side lateral link 13R. The length L4 between the rotation center point P3 of the support member 45 and the connection center point P5 of the right side lever part 47 and the link member is made equal to the length L5 between the rotation center point P6 of the left side support member 44 and the connection center point P6 of the left side lever part 46 and the link member.

Figure 4:
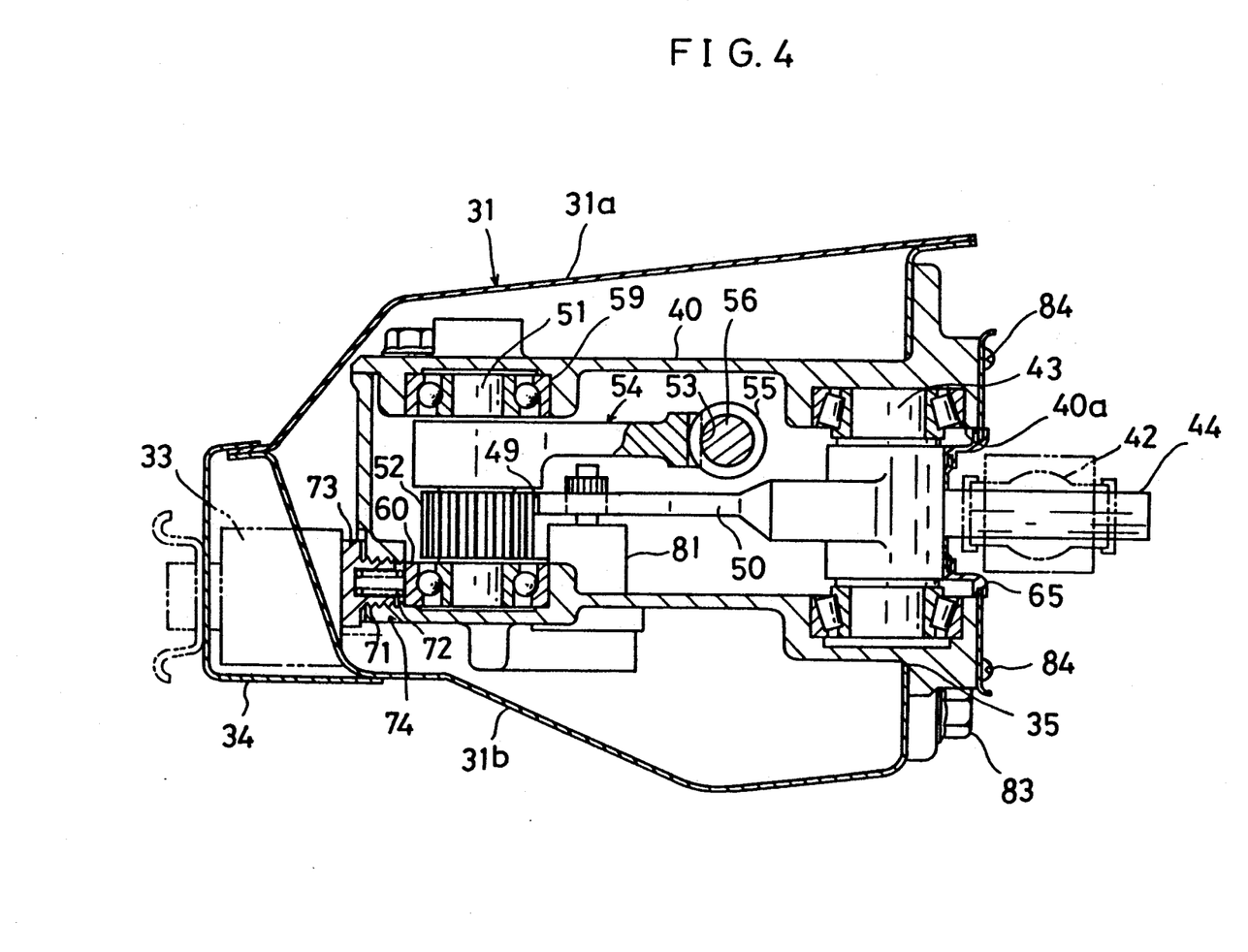
FIG. 4 is a cross section, taken along the line X—X in FIG. 2.

An upper end portion and a lower end portion of the shaft 51 of the first gear 52 are supported rotatably on the housing 40 through the medium of a first bearing 59 and a second bearing 60 respectively. The left side end portion of the transmission shaft 56 is supported rotatably on the housing 40 at the position closer to the third gear 55 in relation to the connecting member 57, through the medium of a third bearing 61. The right side end portion of the transmission shaft 56 is supported on the housing 40 through the medium of a fourth bearing 62 and a support member 63 which holds the fourth bearing 62. A spring 66 which urges the transmission shaft 56 toward the side of the driving motor 58 in its axial direction is provided at the transmission shaft 56.

Figure 5:
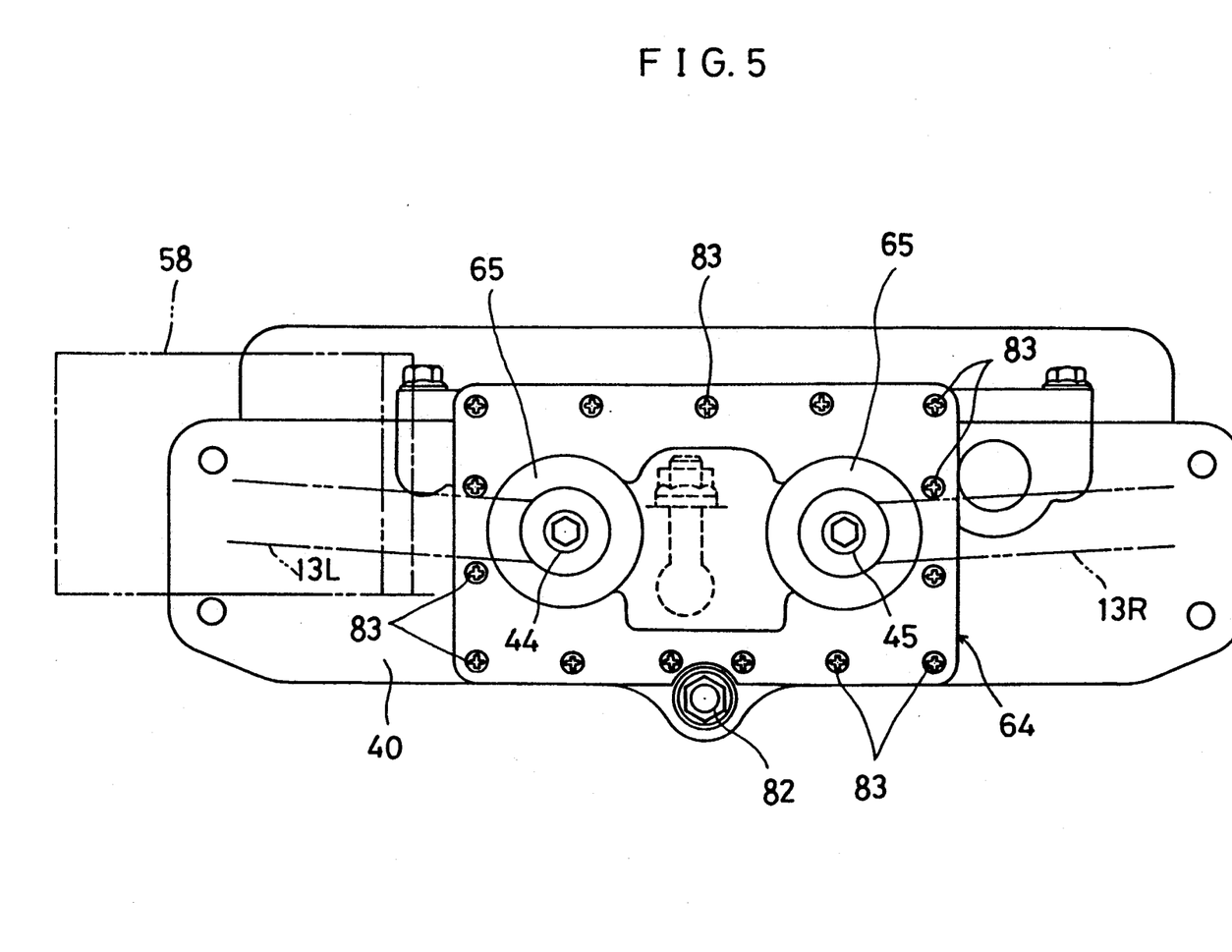
FIG. 5 is a back view of the driving mechanism part, as seen from the rear of a cross member.
Figure 6:
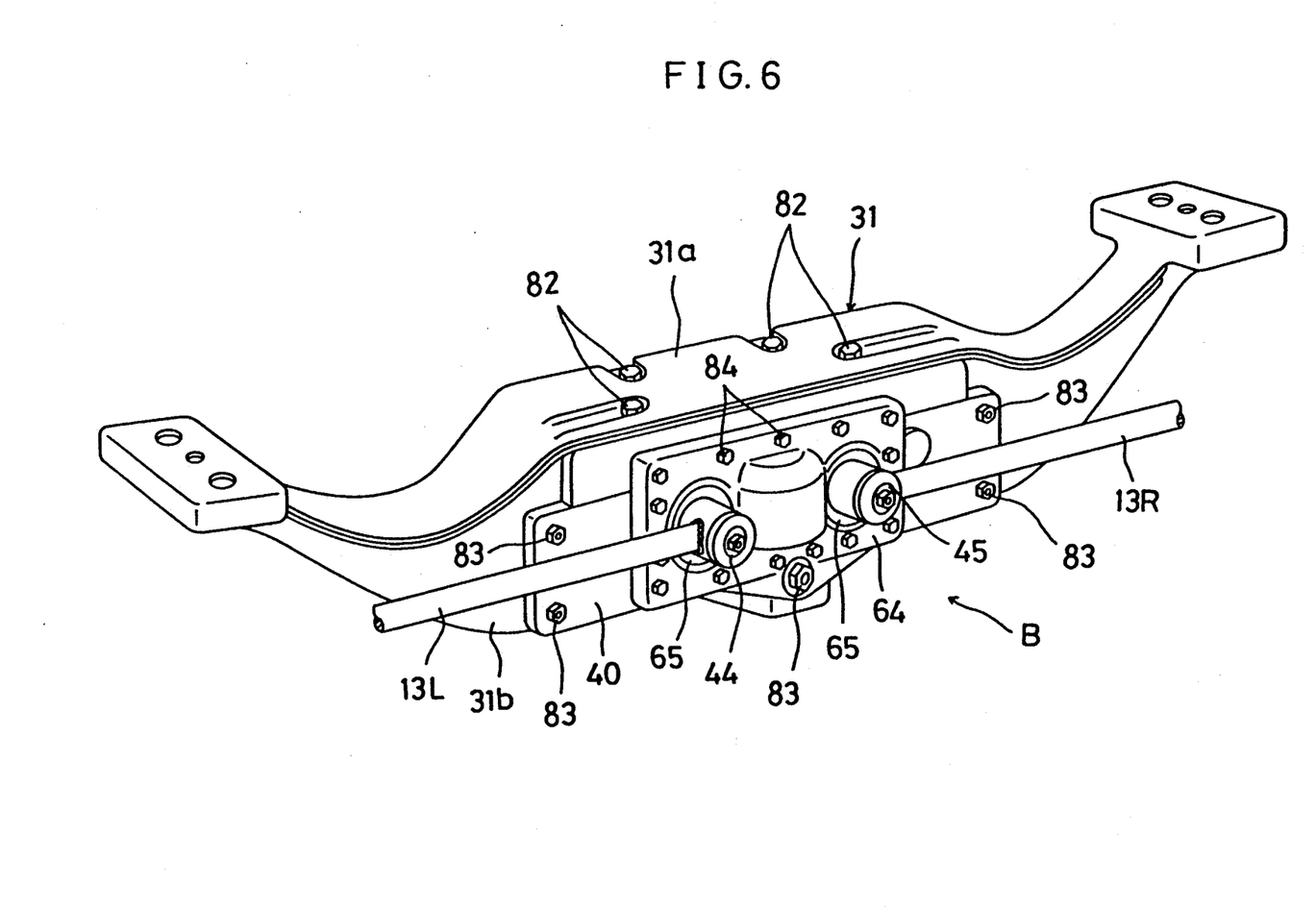
FIG. 6 is a perspective view of the driving mechanism part shown in FIG. 5.

The housing 40 is fixed to the upper surface part (upper panel 31a) and the lower surface part (lower panel 31b) of the cross member 31 at four corner portions by tightening bolts 82 and also fixed at five portions of the peripheral edge of the opening part 35 at the rear side wall surface by tightening bolts 83. The link member 48 is connected substantially at a right angle to the lever parts 46, 47 in a standard state where left and right rear wheels are not steered. The transmission shaft 57 which interconnects the second gear 54 and the driving motor 58 for power transmission is arranged between the second gear 54 and the left side support member 44, with its axial direction directed to the vehicle widthwise direction. An opening hole part 40a is made at the rear surface of the housing 40. A blocking member 64 which blocks up the opening hole part 40a from the rear is provided at the opening hole part 40a by driving a screw 84. The rear ends of left and right support members 44, 45 are sealed movably to the blocking member 64 through the medium of a sealing member 65 made of rubber.

Figure 8:
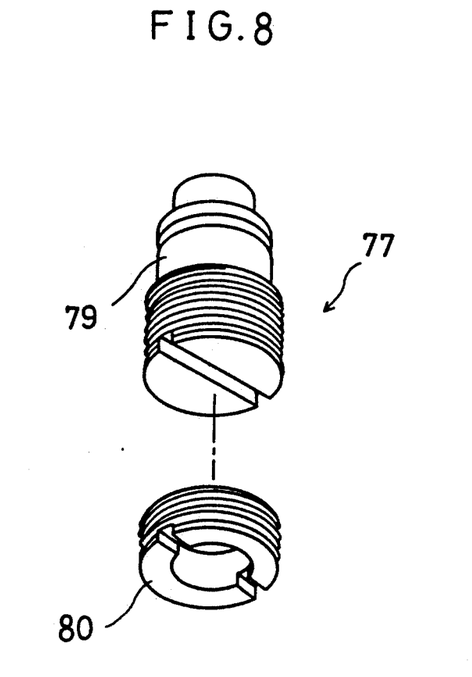
FIG. 8 is a perspective view of an adjusting member, as it is dismantled.

Provided near the second bearing 60 is a first urging means 74 which urges the first gear 52 toward the side of the gear part 49 of the arm part 50 from the direction intersecting the shaft 51 of the first gear 52 at a right angle. The first urging means 74 is provided with a screw hole 71 which is made in the housing 40 at the position opposite to the gear part 49 of the arm part 50 (with the axis 51 of the first gear 52 and the second bearing 60 therebetween), an adjusting member 73 which is screwed in the screw hole 71 and opens toward the second bearing 60 and a spring 72 which is put compressedly between the bottom surface of the hole part of the support member 73 and the second bearing 60. By adjusting the position at which the adjusting member 73 is screwed in the screw hole 71, spring force of the spring 72, namely, urging force of the urging means 74 can be adjusted. Provided near the support member 63 is a second urging means 78 which urges the third gear 55 toward the gear part 53 of the second gear 54 from the direction intersecting the shaft (transmission shaft 56) of the third gear 55. Similarly to the first urging means 74, the second urging means 78 is provided with a screw hole 75 which is made in the housing 40 at the position opposite to the gear part 53 of the second gear 54, with the transmission shaft 56 and the support member 63 therebetween, an adjusting member 77 which is screwed in the screw hole 75 and a spring 76 which is put compressedly between the adjusting member 77 and the support member 63. By adjusting the position at which the adjusting member 77 is screwed in the screw hole 75, spring force of the spring 76, namely, urging force of the urging means 78 can be adjusted. As shown in FIG. 8, the adjusting member 77 comprises a front side member 79 having the surface which opposes the support member 63, between which the spring 76 is compressed, and a rear side member 80 which holds the first side member 79 from its rear surface side.

Reference numeral 81 designates a revolving angle sensor as a revolving angle detecting means which detects revolving angles of the second gear 54. This sensor 81 is fitted to the housing 40 at the position close to the first gear 52 and has a gear 86 which engages with a gear part 85 formed at the top end surface of the arm part 50. With this arrangement, the revolving angle of the second gear 54 can be detected from the revolving angle of the gear 86.

An explanation is made below about the working of the first embodiment, particularly, the working of the driving mechanism part 21 of the rear wheel steering device B.

When the driving motor 58 works, motive power of the motor 58 is transmitted to the arm part 50 via the transmission shaft 57, the third gear 55, the second gear 54 and the first gear 52 in the order given, whereby the arm part 50 and the support member 45 swing within the horizontal surface with the support axis 43 as center of rotation. With this swinging of the arm part 50 and the support member 45, while the rear side lateral link 13R of the right rear wheel 2R is displaced in vehicle widthwise direction, namely, in its axial direction, the rear side lateral link 13L of the left rear wheel 2L is displaced in vehicle widthwise direction by motive power which is received from the right side lever part 47 of the support member 45 via the link member 48, the left side lever part 46 and the left side support member 44, whereby left and right rear wheel are steered symmetrically.

Steering of the rear wheels 2L, 2R is carried out on the basis of the control by the control unit 22 and according to the vehicle velocity as shown in FIG. 7. At the time of low vehicle velocity, the transmission shaft 56, the arm part 50, the link member 48, left and right lever parts 46, 47, a pair (left and right) of the support members 44, 45 and a pair (left and right) of rear side lateral links 13L, 13R of the driving mechanism part 21 revolve in arrow (white in black edge) direction shown in FIG. 3, whereby the rear wheels 2L, 2R are steered in toe-out direction and cornering ability of vehicles is improved. At the time of medium or high vehicle velocity, the transmission shaft 56, the arm part 50, the link member 48, left and right lever parts 46, 47, a pair (left and right) of support members 44, 45 and a pair (left and right) of rear side lateral links 13L, 13R revolve in arrow (slant lines) direction as shown in FIG. 3, whereby the rear wheels 2L, 2R are steered in toe-in direction and running stability of vehicles is improved.

In the case of the first embodiment, as two (left and right) rear side lateral links 13L, 13R are displaced simultaneously in axial direction by motive power outputted from one driving motor 58 in the driving mechanism part 21, it is possible to make the rear wheel steering device B compact, to reduce manufacturing cost of it and to carry out accurately the simultaneous displacement of the two (left and right) rear side lateral links 13L, 13R. Also, it is possible to reduce backlash at engaging parts generated at the driving mechanism part and to restrict generation of "shaking" in rear wheels steering because motive power transmission from the right side support member 45/the rear side lateral link 13R to the left side support member 44/the rear side lateral link 13L is carried out by the link mechanism comprising the two (left and right) lever parts 46, 47 and the link member 48 and the driving mechanism 21 is provided with only a set of gear mechanism comprising gears 52, 54, 55 for power transmission from the driving motor 58 to the right side support member/the rear side lateral link 13R. Furthermore, since the length L1 between the rotation center point P1 of the right side support member 45 and the top end of the arm part 50 is made longer than the length L3 between the rotation center point P1 of the support member 45 and the connection center point P4 of the support member 45 and the rear side lateral link 13R and also the length L2 between the rotation center point P1 of the left side support member 44 and the connection center point P2 of the support member 44 and the rear side lateral link 13L, slip of the rear side lateral links 13L, 13R in vehicle widthwise direction due to backlash at the engaging part of the gear mechanism is lessened and "shaking" in rear wheel steering can be restricted effectively.

As the link member 48 is connected at substantially right angles to each lever part 46, 47 while rear wheels are in non-steered standard state, even if movement of the right side lever part 47 on the driving side is minute, such minute movement is transmitted accurately to the left side lever part 46 on the driven side and accordingly simultaneous displacement of the two (left and right) lateral links 13L, 13R can be carried out accurately.

As the driving mechanism part 21 has a two-step speed reduction mechanism comprising the speed reduction between the third gear 55 and the gear part 53 of the second gear 54 and the speed reduction between the second gear 54 and the first gear 52, it is possible to prevent external force which works on the turning tires, etc. at turning of a vehicle from being inputted as it is in the driving motor 58. Moreover, since the cornering force (external force working on the turning tire) works on the rear side lateral links 13L, 13R toward the inner side of vehicle body or in arrow (white with black edge) direction in FIG. 3 and the side of moving of the transmission shaft 56 in axial direction caused by the cornering force and the side where the driving motor 58 on the transmission shaft 56 are in opposite positional relation, effect of the cornering force on the driving motor 58 can be prevented easily.

Since the engagement between the gear part 49 and the first gear 52 of the arm part 50 and the engagement between the gear part 53 of the second gear 54 and the third gear 55 are urged in engagement intensifying direction by the first urging means 74 and the second urging means 78 respectively, generation of backlash at the both engaging parts can be prevented and accordingly "shaking" in rear wheels steering can be prevented more accurately.

Furthermore, since the transmission shaft 56 and the driving motor 58 are arranged at the dead space between the second gear 54 and the left side support member 44 and the driving mechanism part 21 as a whole is concentrated into one place, the rear wheel steering device B can be made more compact. As the driving mechanism part 21 is unitized and is accommodated in the cross member 31, a crush space at the time of collision at the rear part of vehicle body can be provided the more.

As a revolving angle sensor 81 is provided at the position on the first gear 52 which is smaller in size than the second gear 54 and the revolving angle of the second gear 54 can be detected from the revolving angle of a gear 86 which engages with a gear part 85 of the arm part 50, the revolving gear of the second gear 54 can be detected accurately, while avoiding the interference with other members.

Figure 9:
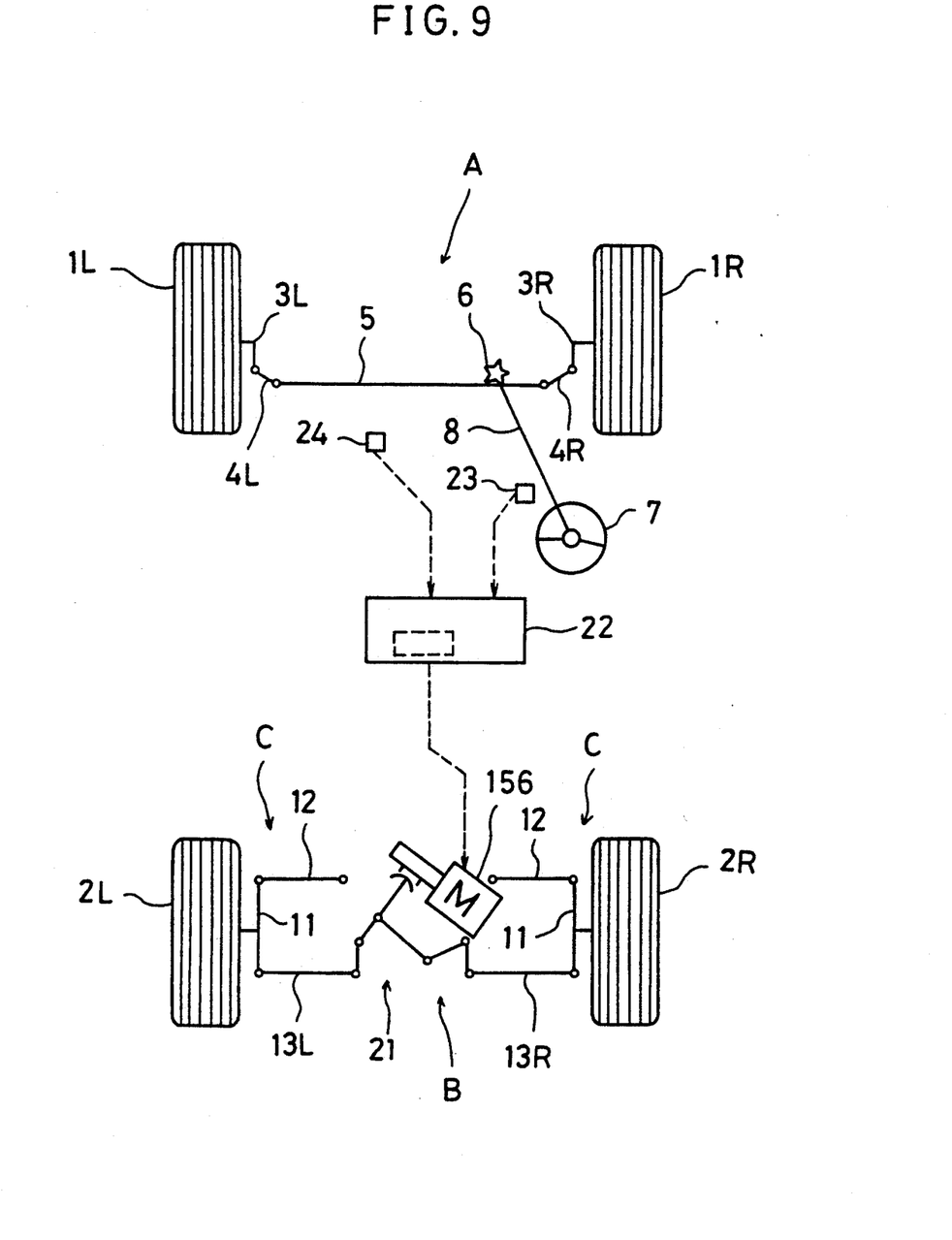
FIG. 9 is a drawing corresponding to FIG. 1.

FIG. 9 shows an overall composition of a steering apparatus for vehicles provided with a rear wheel steering device in the second embodiment of the present invention. The basic composition of the steering device in the second embodiment is almost the same as that of the first embodiment and the same reference numerals are given to the same members and explanation of them is omitted. The steering device of the second embodiment is different from the first embodiment in the composition of the driving mechanism part 21 of the rear wheel steering device B. The composition of this driving mechanism 21 is illustrated concretely in FIG. 10 through FIG. 13.

In FIG. 10 through FIG. 13, reference numeral 31 designates a cross member which is a vehicle body intensifying member arranged in vehicle widthwise direction. The cross member 31 composes a closed section of substantially rectangular shape by an upper panel 31a and a lower panel 31b. End portions of the left and right front side lateral links 12 are connected swingably up and down, through the medium of elastic bushes 33, to the front side of the cross member 31. A cover member 34 for covering the elastic bush 33 is fixed to the front side of the cross member 31. An opening part 35 is provided at the rear side wall surface of the cross member 31 and from this opening part 35, a unitized driving mechanism part 21 of the rear wheel steering device B is inserted into the cross member 31 and is set there.

The driving mechanism part 21 is provided with two (left and right) support members 144, 145 connected with the left and right rear side lateral links 13L, 13R respectively and supported swingably (rotatably) on the housing 40 through the medium of support axes 142, 143 extending in up and down direction, a left side lever part 146 extending horizontally, in slant and frontward direction, toward the inner side of vehicle body (on the side of right side lever part 147 to be described later) from the front end part of the left side support member 144 in plane view, a right side lever part 147 extending horizontally, in slant and rearward direction, toward the inner side of vehicle body (on the side of the left side lever part 146) in plane view, a link member 148 which is connected rotatably at both end portions thereof to top end portions of the left and right lever parts 146, 147 and interconnects the both lever parts 146, 147, and an arm part 149 which extends horizontally from the front end portion of the left side support member 144 toward the inner side of vehicle body (the side opposite to the side where the rear side lateral link member 13L is arranged), in slant and frontward direction (forwardly of the left side lever part 146). The left side support member 144, the lever part 146 and the arm part 149 consist of one bent member 151 (bent at the intermediate part). This bent member 151 is provided swingably within the specified angel range in a horizontal plane around a support axis 142. The support member 145 and the lever part 147 consist of a L-shaped member 152 (bent in L-shape at the intermediate part), which is set swingably within the specified angle range in a horizontal plane around the axis 143.

Formed at a top end of the arm part 149 is a gear part 153 of worm wheel-shape, with which a worm gear 154 engages. The worm gear 154 and the gear part 153 constitute one worm gear mechanism to change the turning force transmitting direction substantially at a right angle. Both end portions of the worm gear 154 are supported rotatably by the housing 40 through the medium of a bearing 155 and one end of the worm gear 154 is extended out of the housing 140 and is connected to a driving motor 156 which is rotatable normally and reversely as actuator. The driving motor 156 is mounted on the housing 140. The housing 140 is fixed to a bottom plate part (lower panel 31b) by tightening bolts at three portions, namely, three flange parts 157 formed at the circumferential edge thereof.

Figure 10:
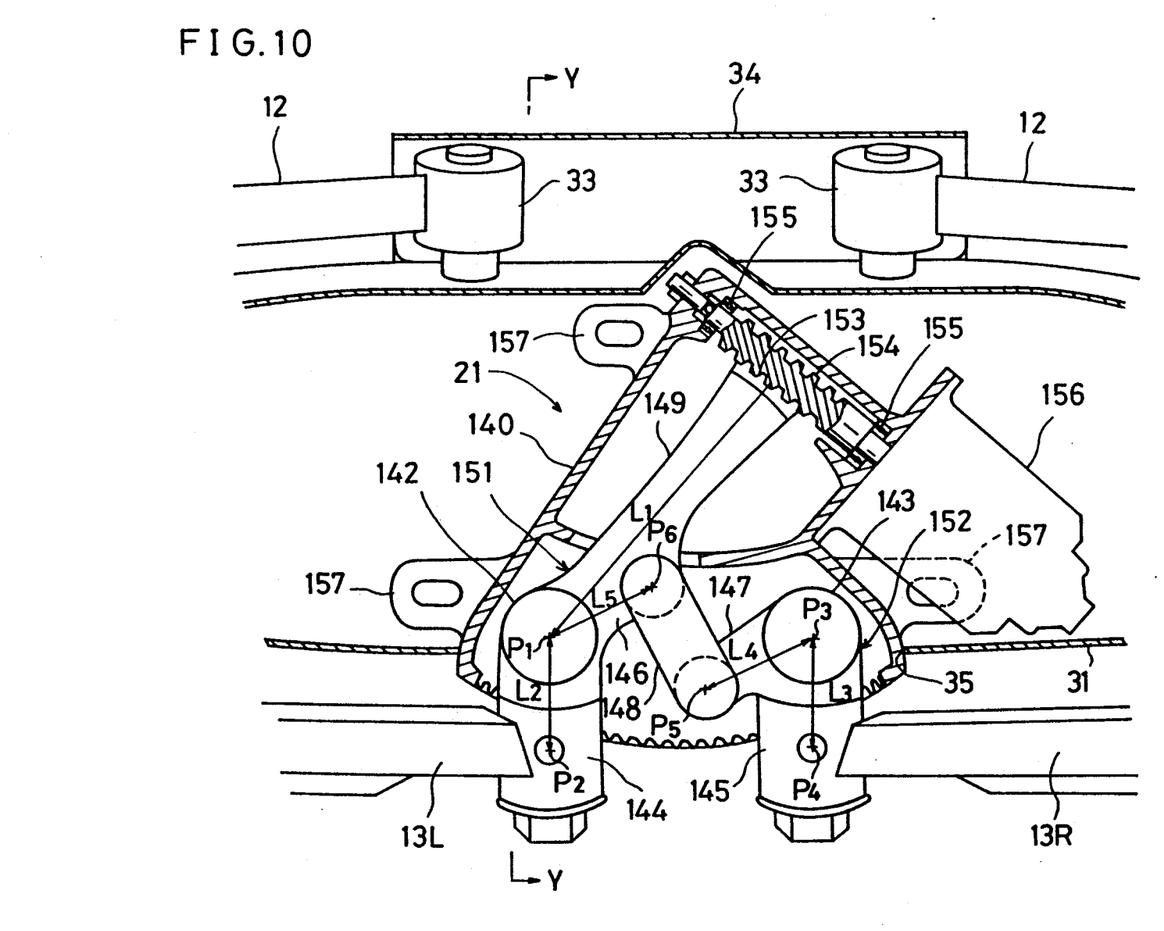
FIG. 10 is a drawing corresponding to FIG. 2.
Figure 11:
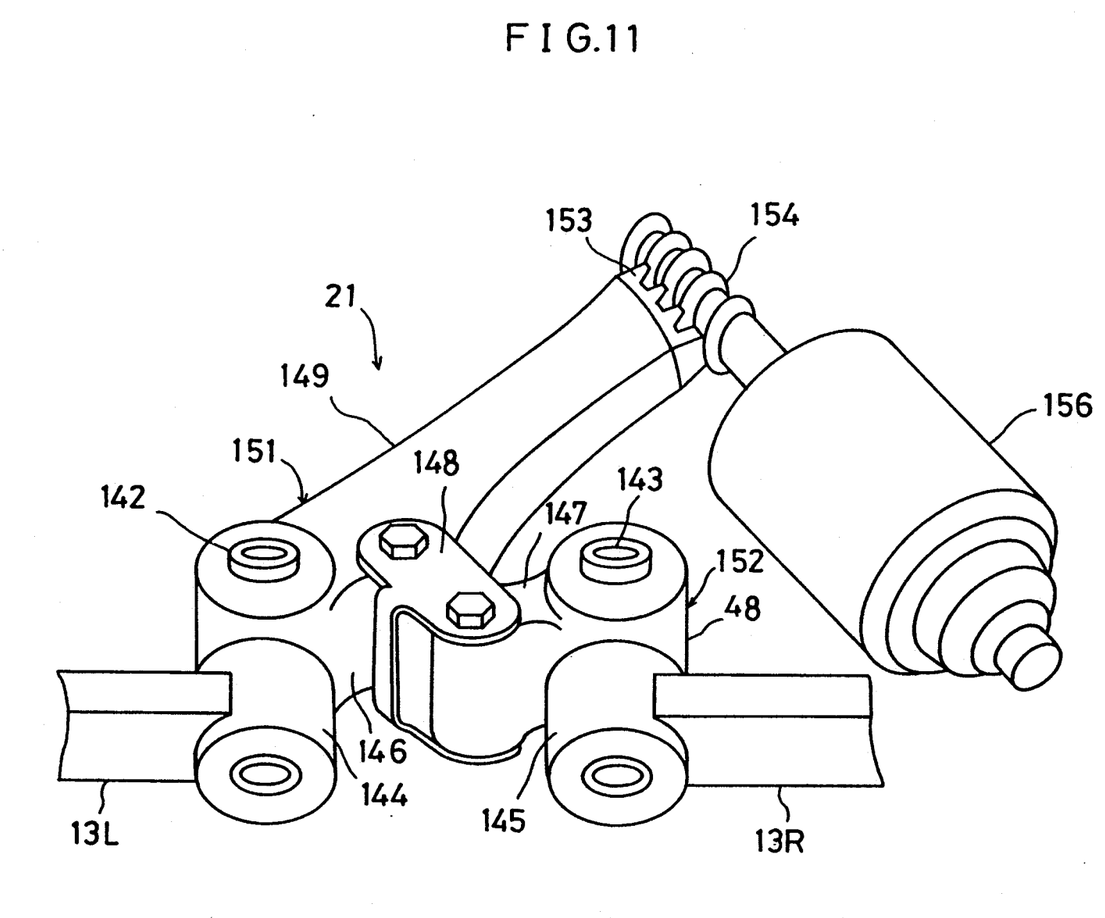
FIG. 11 is a drawing corresponding to FIG. 3.
Figure 12:
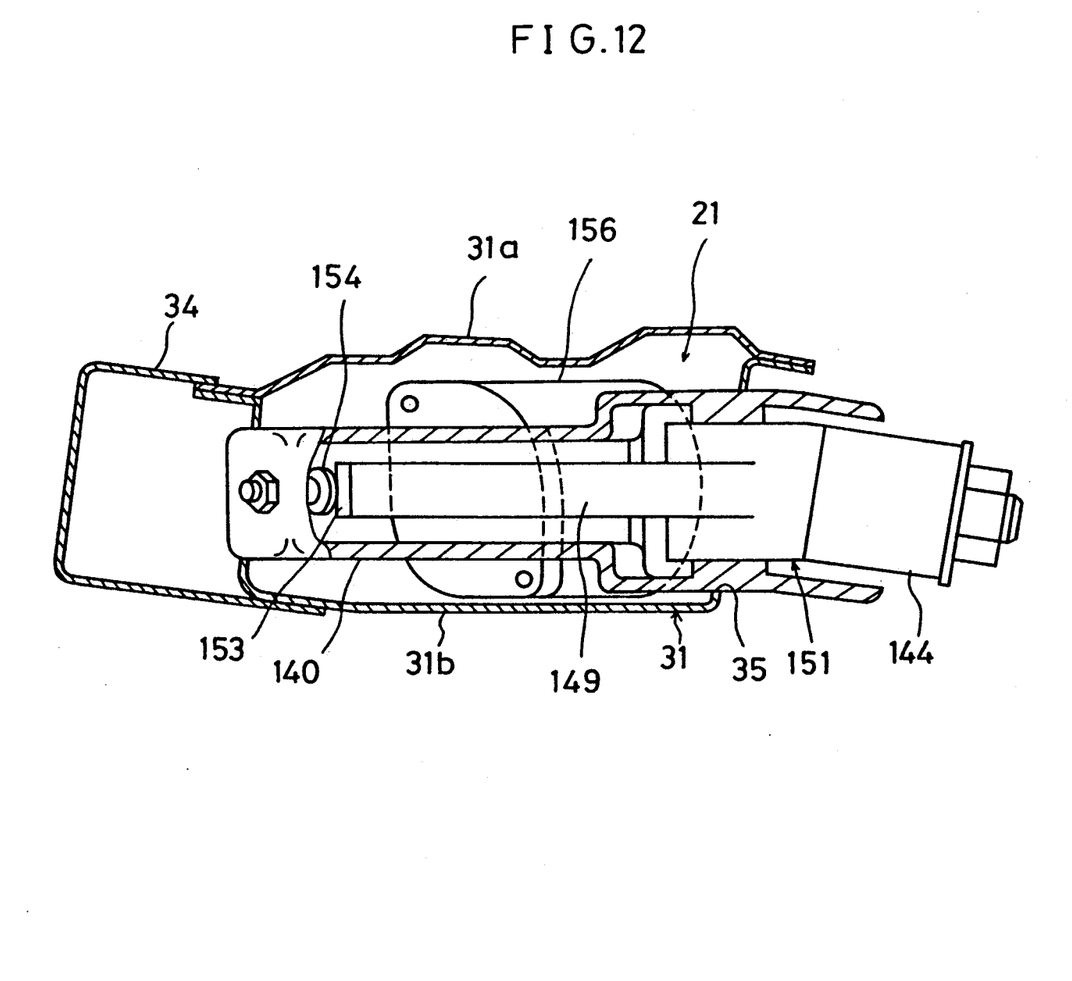
FIG. 12 is a cross section, taken along the line Y—Y in FIG. 10.
Figure 13:
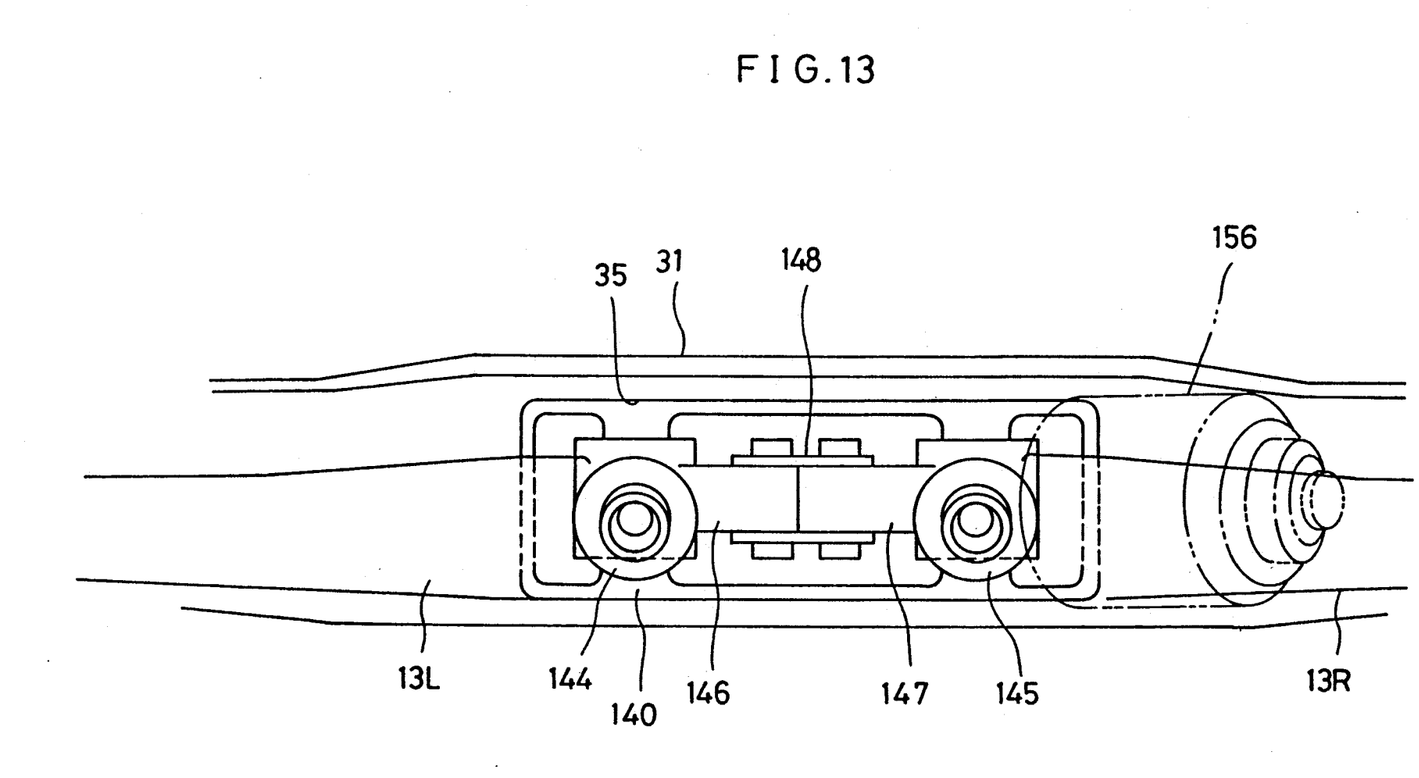
FIG. 13 is a drawing corresponding to FIG. 5.

The length L1 between P1 which is the rotation center point (center point of the support axis 142) of the left side support member 144 and a top end of the arm member 149 is made longer than the length L2 between P1 which is the rotation center point of the support member 144 and P2 which is the connection center point of the support member 144 and the rear side lateral link 13L (L1>L2). The length L3 between the rotation center point P3 of the right side support member 145 (center point of the support axis 143) and P4 which is the connection center point of the support member 145 and the rear side lateral link 13R is made equal to the length L2 between P1 which is the rotation center point of the left side support member 144 and P2 which is the connection center point of the support member 144 and the rear side lateral link 13L. The length L4 between P3 which is the rotation center point P3 of the support member 145 and P5 which is the connection center point of the right side lever part 147 and the link member is made equal to the length L5 between P1 which is the rotation center point of the left side support member 144 and the connection center point P6 of the left side lever part 146 and the link member. The link member 148 is connected to each lever part 146, 147 at substantially right angles in a standard state where rear wheels are not steered.

An explanation is made below about the operation of the second embodiment, particularly, the operation of the driving mechanism of the rear wheels steering device B. When a driving motor 156 works, motive power of the motor 156 is transmitted to an arm part 149 through the medium of a worm gear 154, whereby the arm part 149 and the left side support member 144 swing horizontally around the support axis 142. With this horizontal swinging, the rear side lateral link 13L of the left rear wheel 2L is displaced in vehicle widthwise direction (in its axial direction) and the rear side lateral link 13R of the right rear wheel 2R is displaced in vehicle widthwise direction by motive power received from the left side support member 144 through the medium of the left side lever part 146, the link member 148, the right side lever part 147 and the right side support member 145, whereby the left and right rear wheels 2L, 2R are steered symmetrically. Similarly to the case of the first embodiment, this steering of the rear wheels 2L, 2R is carried out on the basis of control by the control unit 22, according to vehicle velocity as shown in FIG. 7, namely, at the time of low vehicle velocity, rear wheels 2L, 2R are steered in toe-out direction and cornering ability is improved and at the time of medium or high vehicle velocity, the rear wheels 2L, 2R are steered in toe-in direction and running stability is improved.

In the case of the second embodiment, since the driving mechanism has only one worm gear mechanism comprising the worm gear 154 and the gear part 153 as gear engaging part, it is possible to restrict "shaking" in steering of the rear wheels 2L, 2R caused by backlash of gear. Moreover, since the length L1 between the rotation center point P1 of the left side support member 144 and a top end of the arm part 149 is made longer than the length L2 between the rotation center point P1 of the support member 144 and the connection center point P2 of the support member 144 and the rear side lateral link 13L and also the length L3 between the rotation center point P3 of the right side support member 145 and the connection center point P4 of the support member 145 and the rear side lateral link 13R, slip of the rear side lateral links 13L, 13R in vehicle widthwise direction caused by backlash at the engaging part of the worm gear 154 and the gear part 153 is lessened and accordingly "shaking" in rear wheel steering can be restricted more effectively.

As the driving mechanism part 21 is of simple construction using links, it can contribute to compactness and cost reduction of the device. In addition, as the driving mechanism is unitized and accommodated in the cross member 31, a crush space at the time of collision at the rear part can be provided the more at the rear part of vehicle body.

What is claimed is:

1. A rear wheel steering device for steering left and right rear wheels symmetrically, comprising:
    left and right suspension arm members supporting each rear wheel at each one end portion of the suspension arm members and extending in vehicle widthwise direction;
    left and right support members, each provided at other end portion of each suspension arm member, rotatably supporting each suspension arm member and supported swingably by a vehicle body through the medium of a support axis extending in up and down direction;
    two lever parts, each secured to and extending from each support member in opposite direction to each other;
    a link member interconnecting both lever parts; and
    an actuator which revolves one of the left and right support members around said support axis.

2. A rear wheel steering device as defined in claim 1, wherein said link member is connected at a substantially right angle to each lever part in a standard state where rear wheels are not steered.

3. A rear wheel steering device as defined in claim 1, further comprising:
    an arm part extending horizontally from one of said left and right support members and having a gear part at a top end thereof;
    a first gear which engages with the gear part of said arm part; and
    a second gear which is provided on the same axis as the first gear for synchronous rotation and is driven for rotation by said actuator.

4. A rear wheel steering device as defined in claim 3, wherein said second gear and said actuator are connected for motive power transmission through the medium of a transmission shaft which is arranged between said second gear and one of the left and right support members.

5. A rear wheel steering device as defined in claim 3, wherein said arm part extends horizontally from one of the support members toward the side opposite to the side where the suspension arm member is arranged, said first gear engages with the gear part formed at a top end of the arm part and has an axis extending in up and down direction, said second gear is a worm wheel having a gear part at the end surface of the suspension arm member side, said rear wheel steering device further comprising a transmission shaft extending horizontally with one end portion thereof supported rotatably by the vehicle body and the other end thereof connected to said actuator to be driven for rotation, and a third gear which comprises a worm gear which is provided on said transmission shaft for rotation therewith and engages with said second gear.

6. A rear wheel steering device as defined in claim 5, further comprising:
    first urging means which is provided at the position opposite to the gear part of the arm part which engages with said first gear, with an axis of the first gear therebetween, and urges said first gear toward said gear part side from the direction intersecting at a right angle the axis of said first gear; and
    second urging means which is provided at the position opposite to the gear part of the second gear which engages with the third gear, with the transmission shaft therebetween, and urges the third gear toward the side of the gear part from the direction intersecting at a right angle the axis of the third gear.

7. A rear wheel steering device as defined in claim 6, wherein each of said first and second urging means has an adjusting member screwed in a screw hole and a spring supported by said adjusting member, whereby urging force is adjustable by adjusting the position at which said adjusting member is screwed in said screw hole.

8. A rear wheel steering device as defined in claim 5, wherein revolving angle detecting means which detects revolving angles of said second gear is provided at the position on the side of the first gear.

9. A rear wheel steering device as defined in claim 5, wherein said left and right support members, said transmission shaft and said actuator are unitized into a housing and this unit is accommodated in a cross member of closed sectional construction.

10. A rear wheel steering device as defined in claim 3, wherein the length between the rotation center point of said support member and a top end of said arm member extending from said support member is made longer than the length between the rotation center point of said support member and the connecting center point of said support member and the suspension arm member.

11. A rear wheel steering device as defined in claim 1, wherein each of said suspension arm members comprises two front and rear lateral links extending nearly parallel to each in vehicle widthwise direction and rear wheels are steered by displacing the vehicle body side of one of the lateral links in vehicle widthwise direction.

12. A rear wheel steering device as defined in claim 1, wherein said left and right rear wheels are steered in toe-out direction at the time of low vehicle velocity and in toe-in direction at the time of high vehicle velocity.

13. A rear wheel steering device for steering left and right rear wheels symmetrically, comprising:
    left and right suspension arm members supporting each rear wheel at each one end portion of the suspension arm members and extending in vehicle widthwise direction;
    left and right support members, each provided at other end portion of each suspension arm member, rotatably supporting each suspension arm member and supported swingably by a vehicle body through the medium of a support axis;
    two lever parts, each secured to and extending from each support member so as to approach each other;
    a link member interconnecting both lever parts; and
    an actuator which revolves one of the left and right support members around said support axis.

14. A rear wheel steering device for steering left and right rear wheels symmetrically, comprising:
    left and right suspension arm members supporting each rear wheel at each one end portion of the suspension arm members and extending in vehicle widthwise direction;
    left and right support members, each provided at other end portion of each suspension arm member, rotatably supporting each suspension arm member and supported swingably by a vehicle body through the medium of a support axis;
    two lever parts, each secured to and extending from each support member in a substantially perpendicular direction to the support axis;
    a link member interconnecting both lever parts; and
    an actuator which revolves one of the left and right support members around said support axis.

* * * * *